(No Model.)

J. T. VAN GESTEL.
SECONDARY BATTERY.

No. 410,680. Patented Sept. 10, 1889.

Witnesses
Geo. W. Breck
Edward Thorpe

Inventor
Jean Theodore van Gestel
By his Attorneys
Wiedersheim & Kintner

UNITED STATES PATENT OFFICE.

JEAN THEODORE VAN GESTEL, OF NEW YORK, N. Y.

SECONDARY BATTERY.

SPECIFICATION forming part of Letters Patent No. 410,680, dated September 10, 1889.

Application filed December 12, 1888. Serial No. 293,391. (No model.)

*To all whom it may concern:*

Be it known that I, JEAN THEODORE VAN GESTEL, a subject of the King of the Netherlands, residing in New York, county of New York, and State of New York, have made a new and useful Invention in Secondary or Storage Batteries, of which the following is a specification.

My invention relates to that type of electrical secondary or storage batteries in which the active material or material adapted to become active is held in place by retaining plates, grids, or supports; and its objects are, first, to devise an electrode for use in secondary or storage batteries which will more securely hold the active material or material adapted to become active in place and at the same time overcome many of the objectionable features in secondary or storage battery electrodes of this general type; second, to devise an electrode which shall yield an increased amperage per pound weight, thereby increasing the efficiency. I accomplish these objects with the electrode hereinafter described.

In a prior application for a patent filed by me in the United States Patent Office on the 2d day of October, 1888, bearing Serial No. 287,016, I described and claimed an electrode for a secondary or storage battery of the generic type above referred to, and the present application is directed to improvements thereon looking to the advantages sought and enumerated in the statements of the objects of the present invention, as above noted. I therefore make no claim here to the broader features of construction disclosed in both applications, the present application being specifically limited to features hereinafter described, but particularly claimed in the claims which follow this specification.

My invention will be better understood by referring to the accompanying drawings, in which—

Figure 1:
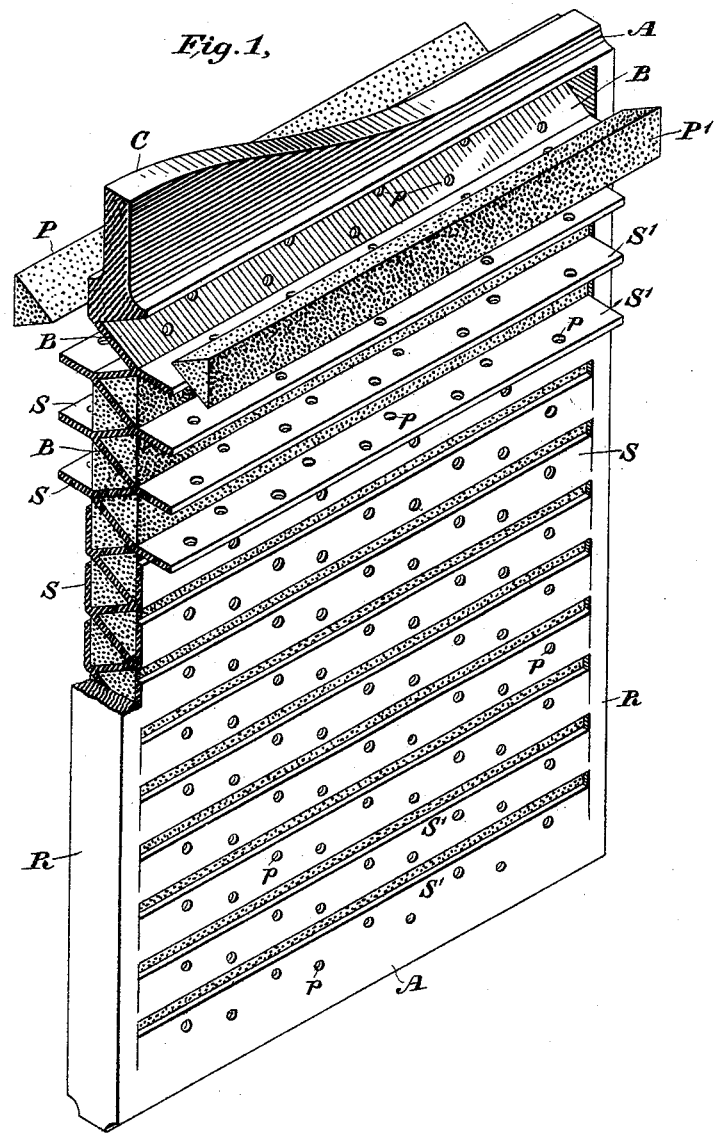
Figure 2:
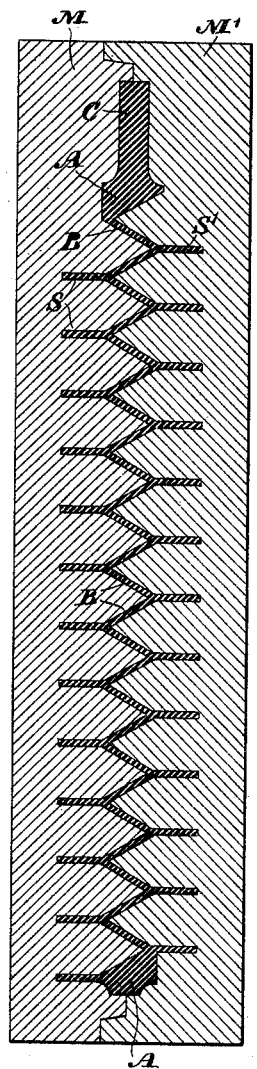
Figure 3:

Figure 1 is a perspective view of an electrode constructed in accordance with my improvement. Fig. 2 is a cross-sectional view taken through the mold or press, showing the electrode support or frame as it appears before the active material is put in place. Fig. 3 is a cross-sectional view of one of my improved rods or bars of active material.

A is the electrode frame or support, which is molded or pressed into the form shown in Fig. 2 in the mold or press M M'. I form this electrode frame or support by taking a piece of sheet-lead or analogous material and placing it in the press or mold M M'. High pressure, as hydraulic pressure, is then applied to the lid of the mold and the lead is forced into the grooves of the respective parts of this mold. When this electrode-support is completed, the backs B B of the retaining corrugations, shelves, or grooves are preferably of triangular form, as clearly shown. The triangular rods or bars P P', of active material, are then laid in place, and the lips, ledges, or shelves S S', attached to the back of the grooves, are then turned up to a vertical position, almost wholly encircling said rods or bars.

A rim R extends around the outer edge of the electrode-support and has a mass portion C, to which the connecting attachments may be united.

Both the backs and shells are perforated, as shown at $p\ p$, thereby affording free access of the electrolyte to the active material.

The triangular shape of the retaining troughs or shelves admit of ready expansion in all directions, but particularly downward in the direction of the length of the electrode, thereby avoiding buckling.

I make the rods or bars P of active material by mixing silicate of soda and oxide of lead in about the proportions of one part of silicate to fifty of oxide of lead, and then moisten this mixture until it assumes the consistency of a paste, after which I place it in molds and submit it to immense pressure. The rods are then removed from the mold and allowed to dry, when they are ready for use.

The silicate of soda performs two useful functions in the combination, viz: it hardens the bar or rod, and during the use of the battery it is gradually dissolved out, leaving a porous mass of the oxide or active material.

Having thus described my invention, what I claim, and desire to secure by Letters Patent of the United States, is—

1. An electrode for use in a secondary or storage battery, made of a single piece of lead or analogous material having angular retaining-shelves on its opposite faces, said shelves being located in a common plane and having turned-up lips or ledges for holding the active material in place, substantially as described.

2. An angular or corrugated retaining plate or support for use in secondary batteries, having active material located in said angles or corrugations, and retaining lips or shelves for holding it secured in place, substantially as described.

3. A retaining plate or support for the active material in a secondary or storage battery, having a series of angular grooves or corrugations on its opposite faces, with retaining lips or shelves attached to the backs of said angular grooves and on the opposite side therefrom, said lips or shelves being adapted to hold the active material more securely in place, substantially as described.

4. A retaining plate or support for the active material of a secondary or storage battery, having angular corrugations on its opposite faces, in combination with lips or shelves attached to the backs of the corrugations, substantially as described.

5. An electrode for a secondary or storage battery, consisting of a corrugated supporting-plate having lips integral with the backs or outer faces of the corrugations, and active material held in place between said lips and the corrugations, substantially as described.

6. An electrode for a secondary or storage battery, consisting of a corrugated or angular depressed supporting-plate having lips or ledges on the outer side or backs of said corrugations or angles, and active material in the shape of compressed bars or rods adapted to fit in the angles or corrugations, as shown, and held in place by said lips or ledges, substantially as described.

7. An electrode for a secondary or storage battery, consisting of a perforated corrugated sustaining-plate having perforated lips or ledges on the backs of the corrugations, with active material held in place by said lips or ledges, substantially as described.

8. Active material for use in storage-batteries in the shape of a bar, rod, or pencil, and composed of silicate of soda and oxide of lead in substantially the proportions named.

9. A compressed bar, rod, or pencil of active material for use in storage-batteries, said bar, rod, or pencil being composed of silicate of soda and oxide of lead, substantially as described.

10. Active material for use in storage-batteries, composed of silicate of soda and oxide of lead, substantially as described.

JEAN THEODORE VAN GESTEL.

Witnesses:
C. J. KINTNER,
L. L. SMITH.